United States Patent [19]

Deluca et al.

[11] Patent Number: 5,191,227
[45] Date of Patent: Mar. 2, 1993

[54] APPARATUS FOR TRANSFERRING CONTROL OF A PLURALITY OF ELECTRICAL DEVICES UPON INTERCONNECTION

[75] Inventors: Alfred E. Deluca, Harvard; George M. Kauffman, Hudson, both of Mass.

[73] Assignee: Digital Equipment Corporation, Maynard, Mass.

[21] Appl. No.: 545,554

[22] Filed: Jun. 29, 1990

[51] Int. Cl.⁵ .......................................... H01H 35/00
[52] U.S. Cl. .................................... 307/38; 307/113; 307/116
[58] Field of Search ................................. 307/38–42, 307/112–116, 140, 147; 364/131, 138; 361/189–191; 340/825.06

[56] References Cited

U.S. PATENT DOCUMENTS

| | | | |
|---|---|---|---|
| 4,054,802 | 10/1977 | Mock | 307/38 |
| 4,206,443 | 6/1980 | Britton | 307/38 X |
| 4,292,542 | 9/1981 | Bajka | 307/28 |
| 4,312,035 | 1/1982 | Greene | 364/200 |
| 4,323,787 | 4/1982 | Sato et al. | 307/38 |
| 4,449,056 | 5/1984 | Shibazaki | 307/38 |
| 4,523,132 | 6/1985 | Christiansen et al. | 315/321 |
| 4,563,592 | 1/1986 | Yuhasz et al. | 307/115 |
| 4,591,731 | 5/1986 | Garcia | 307/132 R |
| 4,659,942 | 4/1987 | Volp | 307/19 |
| 4,794,271 | 12/1988 | McNair | 307/38 |
| 4,987,317 | 1/1991 | Pournain et al. | 307/40 |

Primary Examiner—A. D. Pellinen
Assistant Examiner—David Osborn
Attorney, Agent, or Firm—Denis G. Maloney; Barry Young; Ronald Myrick

[57] ABSTRACT

An apparatus for controlling a plurality of electrical devices, each of the electrical devices including circuitry for switching the electrical device to a standby mode or an operational mode. A main control unit and a secondary control unit is provided in each of the electrical devices. When a main control unit of one electrical device is connected to a secondary control unit of a second electrical device, control of the operational state of the second electrical device is transferred to the remotely located first electrical device. When the two electrical devices are disconnected, local control of the second electrical device is maintained.

22 Claims, 4 Drawing Sheets

APPARATUS FOR TRANSFERRING CONTROL OF A PLURALITY OF ELECTRICAL DEVICES UPON INTERCONNECTION

BACKGROUND OF THE INVENTION

1. Field of the Invention

The present invention relates to apparatus and methods for controlling a plurality of electrical devices, and more particularly, to automatically configuring a series of electrical devices to either a local control mode or a remote control mode.

2. Description of the Related Art

It is often desirable to have the operation of one electrical device dependent on the operation of a different electrical device. For example, in a personal computer system, many electrical devices (for example, a main processing unit, a display and a printer) are interconnected and cooperate to form the system. It is both more convenient and more efficient to control the operational state of each electrical device at a single location.

Figure 1:
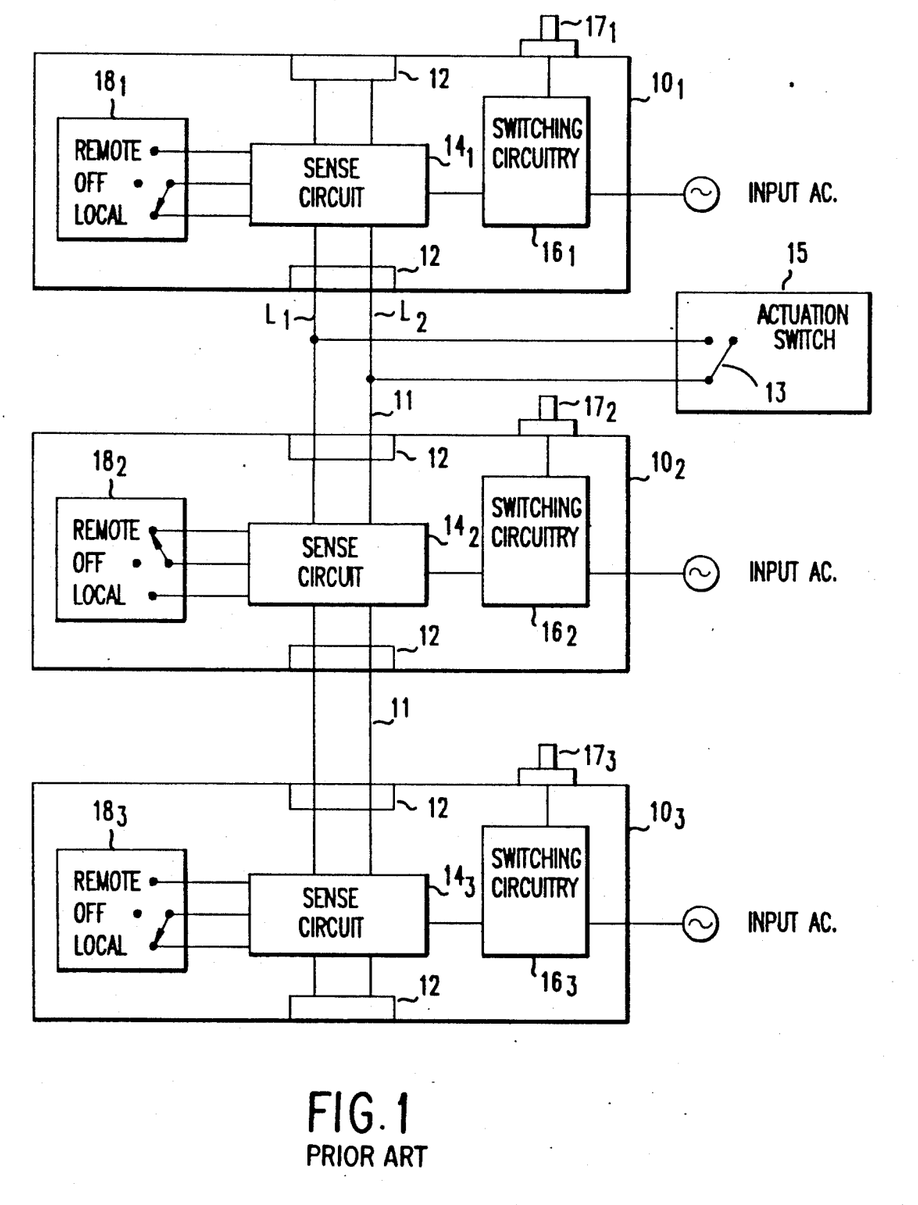
FIG. 1 is a conventional apparatus for controlling a plurality of electrical devices.

One conventional configuration for controlling a plurality of electrical devices is shown, for example, in FIG. 1. A series of electrical devices $10_1$, $10_2$ and $10_3$ are connected via connecting cables 11 to pin connectors 12 on each of the electrical devices $10_1$, $10_2$ and $10_3$. A sense circuit $14_1$, $14_2$ and $14_3$ is provided in each electrical device for detecting a predetermined voltage condition on lines $L_1$ and $L_2$ of the cable. Actuation switch 15 is connected across the lines $L_1$ and $L_2$ of the cable. As shown, actuation switch 15 comprises a manual switch disposed remote from any of the electrical devices $10_1$, $10_2$ and $10_3$. Alternatively, actuation switch 15 may comprise a manual switch disposed on one of the electrical devices $10_1$, $10_2$ or $10_3$. Since sense circuits $14_1$, $14_2$ and $14_3$ are electrically connected in parallel between lines $L_1$ and $L_2$, each sense circuit $14_1$, $14_2$ and $14_3$ is responsive to actuation switch 15.

Switching circuitry $16_1$, $16_2$ and $16_3$ is provided in each of electrical devices $10_1$, $10_2$ and $10_3$ for switching the corresponding electrical device from a standby mode to an operational mode when a.c. power is provided to the corresponding electrical device. For purposes of this description, a.c. power is input to an electrical device and made available to switching circuitry to provide power to the electrical device when its external power switch $17_1$, $17_2$ or $17_3$ is turned ON. An operational mode is a mode in which a.c. power is provided to the electrical device and the electrical device is enabled to perform one of its intended functions. A standby mode is a mode in which a.c. power is provided to the electrical device, but the electrical device is not enabled to perform one of its intended functions.

An external configuration switch $18_1$, $18_2$ and $18_3$ is provided on each of electrical devices $10_1$, $10_2$ and $10_3$ for selecting whether the electrical device is to operate in a local mode or a remote mode, or is to be turned OFF.

In a local mode, an electrical device is not responsive to input signals from external sources, and the operational state of the electrical device is selected locally, i.e. at that electrical device itself. An electrical device is configured to operate in a local control mode, as shown by electrical device $10_1$, by setting the configuration switch $18_1$ to a "local" position. This effectively prevents sensing circuit $14_1$ from sensing a voltage on lines $L_1$ and $L_2$. Instead, in response to the "local" selection of configuration switch $18_1$, sense circuit $14_1$ outputs a control signal to switching circuitry $16_1$ to switch electrical device $10_1$ to an operational mode. In this configuration, electrical device $10_1$ will be in operational mode when power switch $17_1$ is turned ON. Electrical device $10_3$, as shown in FIG. 1, is also configured in a local mode.

An electrical device is configured to operate in a remote mode, as shown by electrical device $10_2$, by setting configuration switch $18_2$ to a "remote" setting. This enables sense circuit $14_2$ to sense a voltage on lines $L_1$ and $L_2$. In particular, when electrical device $10_2$ is configured in a remote control mode and actuation switch 15 is actuated, an electrical connection is made across lines $L_1$ and $L_2$ by contact 13. Sensing circuit $14_2$ senses this connection and outputs a control signal to switching circuitry $16_2$ to switch electrical device $10_2$ to an operational mode. When actuation switch 15 is not actuated, sensing circuit $14_2$ does not output the control signal to switch $16_2$ and the electrical device is in a standby mode. Hence, in a remote mode, the operational state of an electrical device is dependent on the activation and deactivation of the remotely located actuation switch 15.

When configuration switch $18_1$, $18_2$ or $18_3$ is an "OFF" position, sensing circuit $14_1$, $14_2$ or $14_3$ does not output the control signal to switching circuitry $16_1$, $16_2$ or $16_3$, respectively. Thus, even if power switch $17_1$, $17_2$ or $17_3$ is turned ON, the corresponding electrical device $10_1$, $10_2$ or $10_3$ will not achieve an operational mode.

The conventional configuration, shown for example in FIG. 1, has a number of disadvantages. In particular, each electrical device must be separately configured using external configuration switches $18_1$, $18_2$ and $18_3$. This is inconvenient and inefficient.

Further, installation of a separate actuation switch 15 is necessary to render the electrical devices, configured in a remote control mode to an operational mode. This increases the costs of the system.

Furthermore, in this conventional configuration, when an electrical device configured in a remote control mode is disconnected from the other electrical devices in a series of electrical devices by disconnecting cable 11, that electrical device, and all those connected to it in the series, are turned OFF by sensing circuit $14_1$, $14_2$ or $14_3$. This is particularly disadvantageous if one of the electrical devices is inadvertently disconnected or requires service.

SUMMARY OF THE INVENTION

Accordingly, it is an object of the present invention to provide an apparatus for controlling a plurality of electrical devices.

It is another object of the present invention to provide an apparatus for automatically configuring a plurality of electrical devices.

It is another object of the present invention to provide an apparatus for automatically configuring a series of electrical devices from a local control mode to a remote control mode, such that only one of the electrical devices controls the operation of the remaining electrical devices in the series.

It is another object of the present invention to provide an apparatus for configuring an electrical device to operate as a main electrical device, a secondary electrical device or both in a series of electrical devices.

It is another object of the present invention to provide an apparatus for configuring an electrical device to operate as a secondary electrical device in a first series of electrical devices and as a main electrical device in a second series of electrical devices.

It is another object of the present invention to provide an apparatus which allows disconnection of one or more electrical devices in a series of electrical devices without turning OFF the disconnected electrical devices.

Additional objects and advantages of the present invention will be set forth in the description which follows, and in part, will be apparent from the description or may be learned by the practice of the invention. The objects and advantages of the invention may be realized and attained by at least the apparatuses defined by the appended claims.

To achieve at least the foregoing objects, and in accordance with the purposes of the invention as embodied and broadly described herein, an apparatus of this invention is provided for controlling a plurality of electrical devices, each of the plurality of electrical devices including switching circuitry for switching each of the plurality of electrical devices to a standby mode or an operational mode, and comprises a main control unit provided in each of the plurality of electrical devices; a secondary control unit provided in each of the plurality of electrical devices; and first connecting means for connecting a main control unit of a first one of the plurality of electrical devices to a secondary control unit of a second one of the plurality of electrical devices such that an operational state of said second one of the plurality of electrical devices is controlled by the main control unit of the first one of the plurality of electrical devices.

BRIEF DESCRIPTION OF THE DRAWINGS

The accompanying drawings, which are incorporated in and constitute a part of the specification, illustrate presently preferred embodiments for carrying out the invention and, together with the general description above and the detailed description of the preferred embodiments given below, serve to explain the objects, advantages and principles of the invention. Of the drawings.

DESCRIPTION OF THE PREFERRED EMBODIMENTS

In accordance with the present invention, there is provided a plurality of electrical devices including switching circuitry for switching each of the plurality of electrical devices to a standby mode or an operational mode, each of the electrical devices having a main control unit and a secondary control unit. As embodied herein, FIG. 2 shows a series of connected electrical devices $20_1, 20_2, 20_3 \ldots 20_n$, each comprising a main control unit $22_1, 22_2, 22_3 \ldots 22_n$ and a secondary control unit $24_1, 24_2, 24_3 \ldots 24_n$ connected to switching circuitry $26_1, 26_2, 26_3 \ldots 26_n$, contained in each electrical device.

In accordance with the present invention, first connecting means are provided for connecting a main control unit of a first one of the plurality of electrical devices to a secondary control unit of a second one of the plurality of electrical devices such that an operational state of the second one of the plurality of electrical devices is controlled by the main control unit of the first one of the plurality of electrical devices. As embodied herein, main control unit $22_1$ of electrical device $20_1$ is connected to secondary control unit $24_2$ of electrical device $20_2$ by a first connecting means $28_1$, and secondary control unit $24_2$ of electrical device $20_2$ is connected to secondary control unit $24_3$ of electrical device $20_3$ by second connecting means $28_2$. The secondary control unit 24 of each subsequent electrical device in the series is connected to the secondary control unit of the previous electrical device in the series by additional connecting means up to connecting means $28_{n-1}$.

Figure 2:
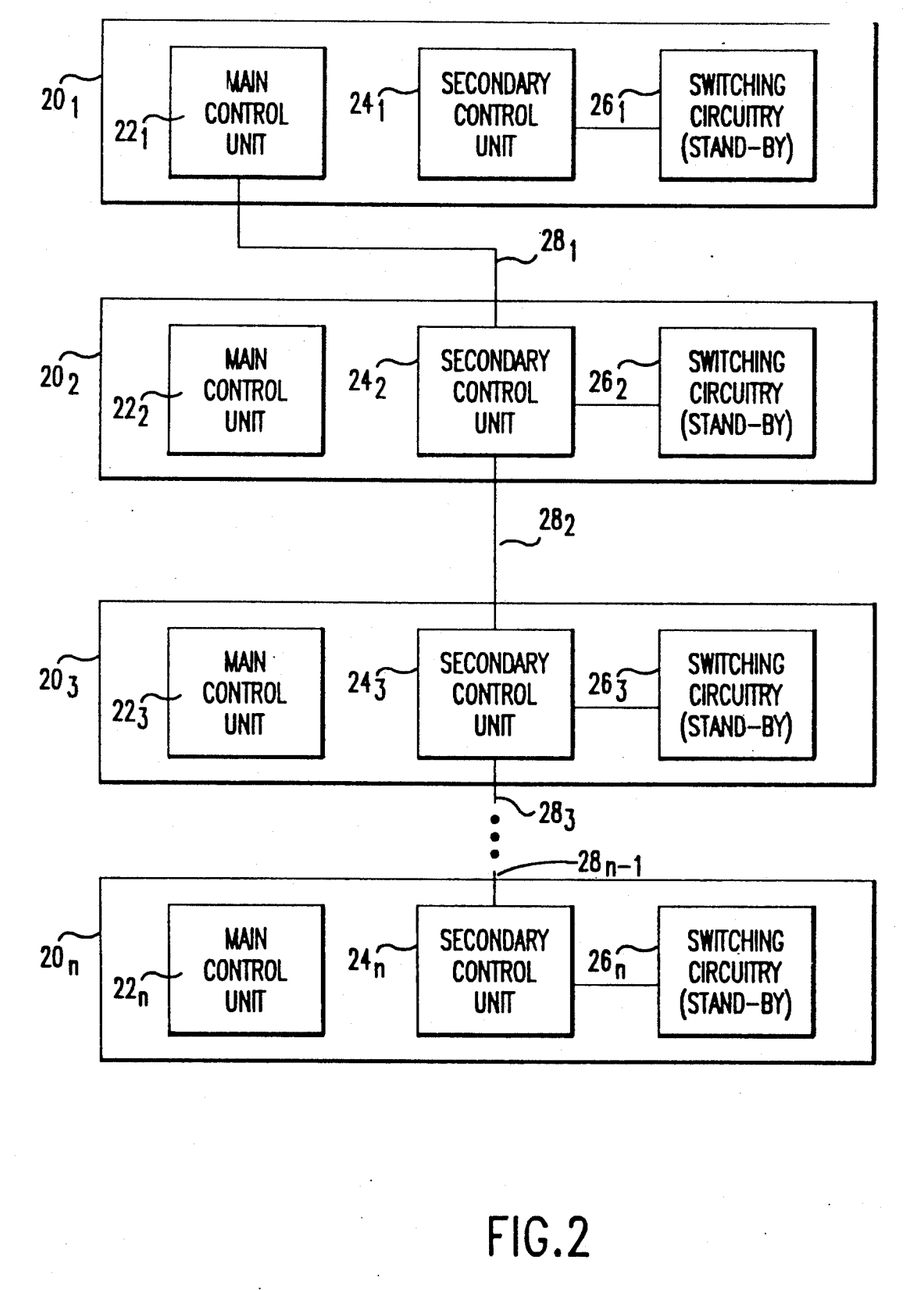
FIG. 2 is a block diagram of an embodiment of an apparatus for controlling a plurality of electrical devices in accordance with the present invention.

As described in detail below, connection of the electrical devices as shown in FIG. 2, permits control of the operational state of electrical devices $20_2, 20_3 \ldots 20_n$ to essentially be transferred to electrical device $20_1$ In this configuration, electrical device $20_1$ is configured as a main electrical device because it controls the operational state of electrical devices $20_2, 20_3 \ldots 20_n$ and electrical devices $20_2, 20_3 \ldots 20_n$ are configured as secondary electrical devices because the operational state of these electrical devices is controlled by electrical device $20_1$.

Figure 3:
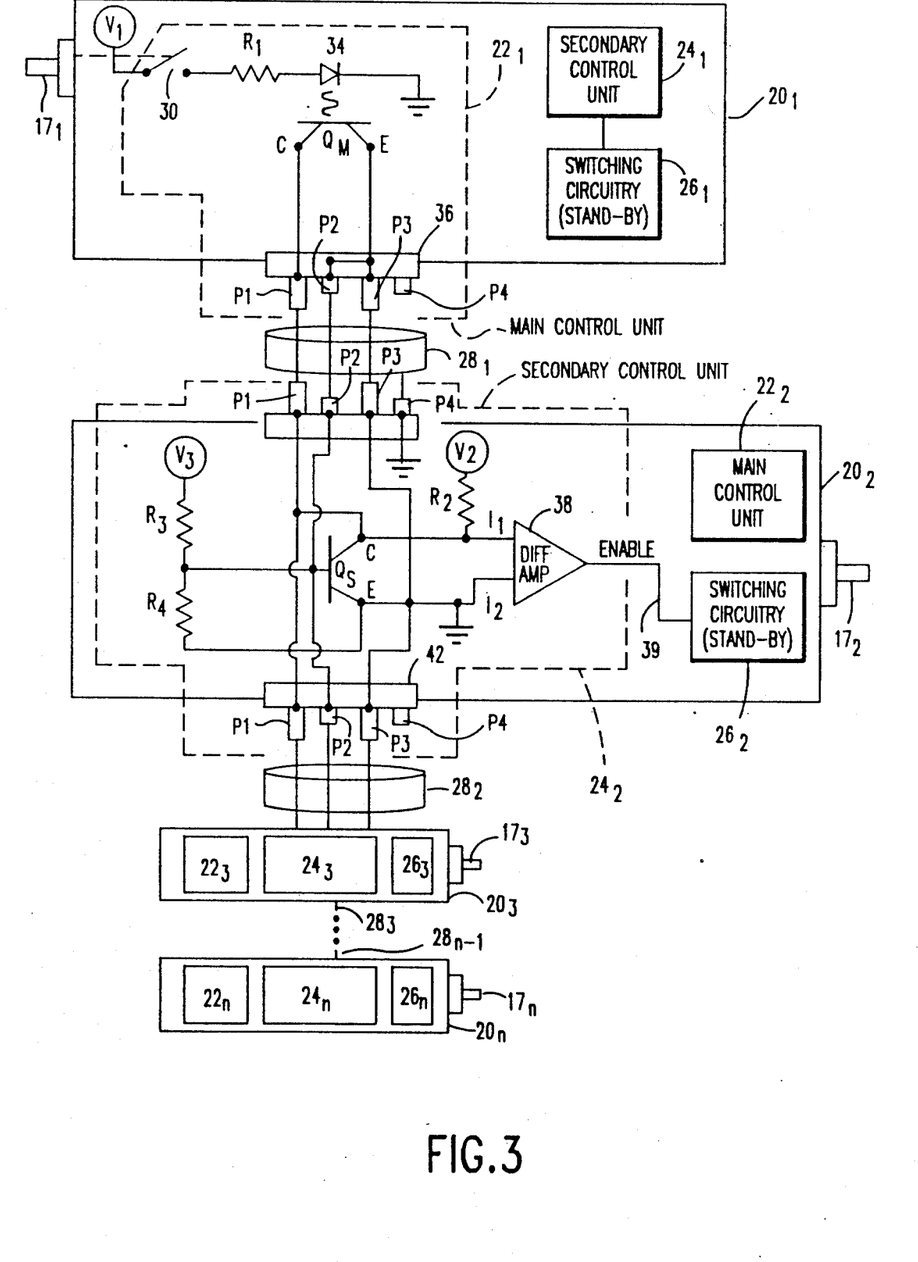
FIG. 3 is a circuit diagram of the embodiment of the apparatus shown in FIG. 2, showing its construction in schematic and block diagram form.

FIG. 3 shows a circuit diagram of a main control unit and a secondary control unit. For convenience, the circuitry of a main control unit is shown only in main control unit $22_1$ of main electrical device 20 and the circuitry of a secondary control unit is shown only in secondary control unit $24_2$ in secondary electrical device $20_2$. However, it is contemplated that the circuitry of each main control unit and each secondary control unit of each electrical device in the series is to be identical to the circuitry of main control unit $22_1$ and secondary control unit $24_2$, respectively. Details of the switching circuitry $26_1, 26_2, 26_3 \ldots 26_n$ are not shown in the drawings because circuitry for switching the electrical device between a standby mode and an operational mode, and to an OFF state, is conventional and known to the art.

In accordance with the invention, each main control unit includes a first switch. As embodied herein, this first switch includes a phototransistor $Q_m$ in main control unit $22_1$. Preferably, main control unit $22_1$ also includes a contact 30 connected to an external power switch $17_1$, voltage source $V_1$, resistor $R_1$ and light emitting diode 34 connected in series with contact 30, and output pin connector 36 having a plurality of pins $P_1$-$P_4$. While contact 30 is shown to be mechanically coupled directly to external power switch $17_1$, contact 30 need not be so coupled, and may be responsive to any desired circuitry or condition. Light emitting diode 34 is positioned to irradiate phototransistor $Q_m$ during circuit operation. Preferably, the emitter E of phototransistor $Q_m$ is connected to pin P3 of output pin connector 36, and the collector C of phototransistor $Q_m$ is connected to pin P1 of output pin connector 36. In addition, pin preferably 12 volts.

In accordance with the invention, each secondary control unit includes a second switch and a sensing circuit, the sensing circuit having at least one input connected to an output of the second switch and having an output connected to the switching circuitry. As embodied herein, the sensing circuit includes a differential amplifier 38, and the second switch includes a transistor $Q_s$. Preferably, output leads from the collector C and the emitter E of transistor $Q_s$ form the respective inputs $I_1$ and $I_2$ of differential amplifier 38. Input $I_1$ of differential amplifier 38 is also connected to a voltage source $V_2$ through resistor $R_2$. Preferably, voltage source $V_2$ is 12 volts. The output of differential amplifier 38 is connected to switching circuitry $26_2$. In response to a voltage differential across its inputs $I_1$ and $I_2$, differential amplifier 38 outputs an enable signal 39 to switching circuitry $26_2$ to switch the corresponding electrical device to an operational mode.

Preferably, the base of transistor $Q_s$ is biased by a voltage divider circuit including resistors $R_3$ and $R_4$ and voltage source $V_3$. Resistor $R_3$ is connected to voltage source $V_3$ and resistor $R_4$, and the base of transistor $Q_s$ is connected between resistors $R_3$ and $R_4$. Resistor $R_4$ is also coupled to the emitter E of transistor $Q_s$. Preferably, $V_3$ is 12 volts.

As embodied herein, each secondary control unit further includes an input pin connector 40 and an output pin connector 42, each having a plurality of pins $P_1$-$P_4$. The collector C of transistor $Q_s$ is connected to pin P1 of both the input and output pin connectors 40 and 42, the emitter E of transistor $Q_s$ is connected to pin P3 of both the input and output pin connectors 40 and 42 and the base of transistor $Q_s$ is connected to pin P2 of both the input and output pin connectors 40 and 42. The emitter E of $Q_s$ and input $I_2$ of differential amplifier 38 are grounded.

The first connecting means 28, as embodied, connects the main control unit $22_1$ of electrical device $20_1$ to the secondary control unit $24_2$ of electrical device $20_2$. The second connecting means $28_2$, as embodied, connects the secondary control unit $24_2$ of electrical device $20_2$ to the secondary control unit $24_3$ of electrical device $20_3$. Preferably, first and second connecting means $28_1$ and $28_2$ are cables with pin connectors at each end for connection to the pin connectors of each main and secondary control unit. As configured, pins $P_1$-$P_3$ of output pin connector 36 of main control unit $22_1$ are respectively connected to pins P1-P3 of input pin connector 40 of secondary control unit $24_2$ of electrical device $20_2$ by cable $28_1$, and pins P1-P3 of output pin connector 42 of secondary control unit $24_2$ are respectively connected to pins P1-P3 of input pin connector (not shown) of secondary control unit $24_3$ of electrical device $20_3$ by cable $28_2$. Preferably, pin P4 of each input pin connector 40 of each secondary control unit is a ground connection to ground a shield provided in cables $28_1$, $28_2$, $28_3$...$28_{n-1}$. Pin P4 of output pin connector 26 of each main control unit and output pin connector 42 of each secondary control unit $24_2$ are not connected.

As embodied herein, each electrical device is separately connected to an a.c. power source (not shown), and the power switch ($17_2$, $17_3$...$17_n$) for each electrical device configured as a secondary electrical device ($20_2$, $20_3$...$20_n$) is turned ON and kept in the ON position.

In accordance with the present invention, at least one input of the sensing circuit of the secondary control unit of the second one of the plurality of electrical devices is connected by the first connecting means to the first switch in the main control unit of the first one of the plurality of electrical devices such that the sensing circuit is controlled by the first switch when the first connecting circuit is connected to both the first and second ones of the plurality of electrical devices, and the sensing means is controlled by the second switch when the first connecting means is disconnected from either of the first and second ones of the plurality of electrical devices.

In operation of the embodiment of FIG. 3, when power switch $17_1$ of main electrical device $20_1$ is turned ON, contact 30 closes, which allows voltage source $V_1$ to energize light emitting diode ("LED") 34 through resistor $R_1$. Light from LED 34 turns ON phototransistor $Q_m$. When phototransistor $Q_m$ is turned ON, current flows from voltage source $V_2$ in secondary control unit $24_2$ of electrical device $20_2$, through resistor $R_2$, out pin 1 of input pin connector 40, through cable $28_1$, into pin 1 of output pin connector 36 of main control unit $22_1$ of electrical device $20_1$, through phototransistor $Q_m$ out pin 3 of output pin connector 36, through cable $28_1$ into pin 3 of input pin connector 40 of secondary control unit $24_2$ of electrical device $20_2$, to ground. This current flow causes a voltage drop across resistor $R_2$ and a voltage differential across inputs $I_1$ and $I_2$ of differential amplifier 38 sufficient to cause differential amplifier 38 to output enable signal 39 to switching circuitry $26_2$ to switch the electrical device $20_2$ from a standby mode to an operational mode.

When power switch $17_1$ of main electrical device $20_1$ is turned OFF, contact 30 opens, turning OFF LED 34, hence, turning OFF phototransistor $Q_m$. The voltage differential across inputs $I_1$ and $I_2$ of differential amplifier 38 is too great to cause differential amplifier 38 to output enable signal 39. Transistor $Q_s$ of electrical device $20_2$ is prevented from turning ON by an electrical short between pins 2 and 3 of output pin connector 36 of main control unit $22_1$ of electrical device $20_1$. In particular, the base of transistor $Q_s$ is grounded through pin 3 of input pin connector 40, through cable $28_1$, through pin 3 of output pin connector 36, which is shorted to pin 2 of output pin connector 36, through cable $28_1$ and pin 2 of input pin connector 40 of secondary control unit $24_2$ of electrical device $20_2$. Hence, transistor $Q_s$ stays OFF and transistor $Q_m$ continues to control electrical device $20_2$ even though power switch $17_1$ is turned OFF.

Thus, in accordance with the invention, when electrical devices $20_1$ and $20_2$ are configured as embodied herein, local control of the operational state of the secondary electrical device $20_2$ is essentially transferred to the main control unit $22_1$ of the remotely located main electrical device $20_1$.

As shown in FIG. 3, output pin connector 42 of the secondary control unit $24_2$ of electrical device $20_2$ is electrically connected in parallel across transistor to the pins of input pin connector 40. In this manner, when secondary control unit 24 of electrical device $20_2$ is connected to an input pin connector (not shown) of secondary control unit $24_3$ of electrical device $20_3$. via cable $28_2$, local control of the operational state of electrical device $20_3$ is transferred to main control unit $20_1$ of remote electrical device $20_1$ in a manner similar to that described above with respect to electrical devices $20_1$ and $20_2$. By this configuration, one remote electrical device can control the operational state of a series of electrical devices having their secondary control units interconnected.

In accordance with the invention, the second one of the plurality of electrical devices includes means for controlling the operational state of the second one of the plurality of electrical devices when the first connecting means is disconnected from either of the first and second ones of the plurality of electrical devices. As embodied in FIG. 3, this means includes transistor $Q_s$. In operation, when cable $28_1$ is disconnected from either of electrical devices $20_1$ or $20_2$, transistor $Q_s$ is turned ON by the biasing of its base (the short across pins 2 and 3 of output pin connector 36 no longer exists). This causes a voltage drop across $R_2$ and a voltage differential at inputs $I_1$ and $I_2$ of differential amplifier 38, which, in turn, enables switching circuitry $26_2$ to switch electrical device $20_2$ to an operational mode. Thus, if a secondary control unit of an electrical device is disconnected from either a main control unit or a secondary control unit of another electrical device, local control of the operational state of the disconnected electrical device is maintained. In particular, when disconnected, an electrical device turns ON, rather than OFF. Since disconnection of the cables 28 may generate large electrical switching transients (noise), to prevent undesired switching, the differential amplifier 38 should preferably be slow to respond to the differential voltage at inputs $I_1$ and $I_2$ caused by the switching transients.

In accordance with the invention, the output pin connectors of the main control units of the electrical devices and the input and output pin connectors of the secondary control units of the electrical devices include a plurality of pins, at least two predetermined pins of each of the input and output pin connectors being longer than the remaining pins thereof, and wherein pin numbers of the longer pins of the output pin connector of the main control units correspond to pin numbers of the longer pins of the input and output pin connectors of the secondary control units.

As embodied herein, pin connectors 36, 40 and 42 each contain pins 1-4. Preferably, pins 1 and 3 are longer than pins 2 and 4. In this manner, pins 1 and 3 make before and break after pins 2 and 4, such that control is transferred between electrical devices with minimal electrical disturbance.

Because an electrical device includes both a main control unit and a secondary control unit, in accordance with the present invention, the electrical device can be configured as either a main electrical device or a secondary electrical device, or as both a main electrical device for one series of electrical devices and as a secondary electrical device in a second series of electrical devices.

In accordance with the invention, means are provided for connecting a main control unit of a first one of electrical devices in a first series of electrical devices to a secondary control unit of a second one of the electrical device in the first series of electrical devices. As embodied in FIG. 4, series I of electrical devices includes a main electrical device $EDI_1$ and a series of electrical devices $EDI_2$, $EDI_3$ and $EDI_4$. The means for connecting includes cable $28I_1$ connected to the output pin connector (not shown) of the main control unit of $EDI_1$ and to the input pin connector (not shown) of the secondary control unit of $EDI_2$.

Figure 4:
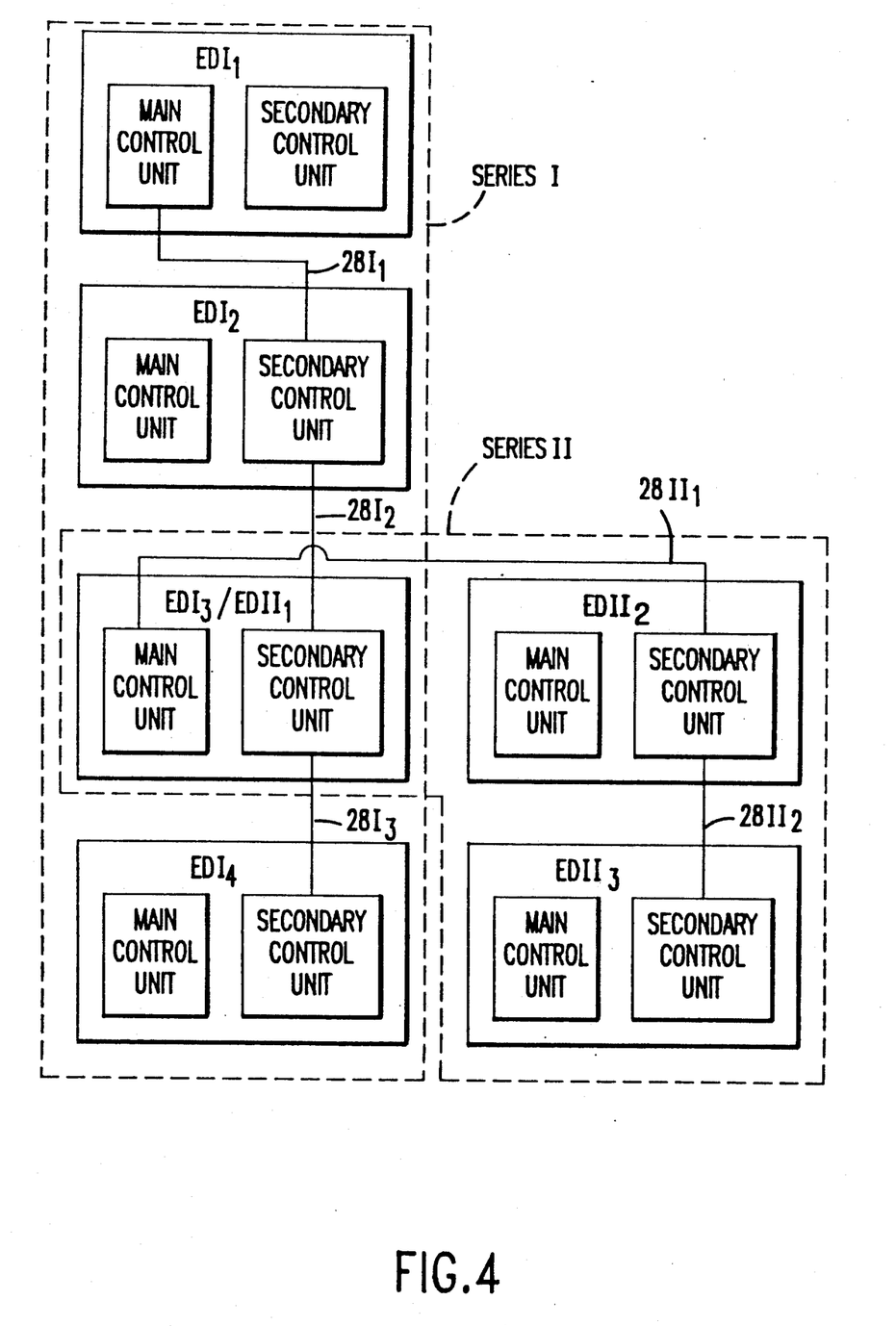
FIG. 4 is a block diagram of another embodiment of an apparatus for controlling a plurality of electrical devices in accordance with the present invention.

Also in accordance with the invention, means are provided for connecting the secondary control units of each remaining electrical device in the first series of electrical devices such that an operational state of each electrical device in the first series of electrical devices is controlled by the first one of the electrical devices in the first series of electrical devices. As embodied herein, this means includes cables $28I_2$ and $28I_3$ connected to the output and input pin connectors (not shown) of the secondary control units of $EDI_2$, $EDI_3$ and $EDI_4$.

In accordance with the invention, means are further provided for connecting the main control unit of a predetermined one of the electrical devices in the first series of electrical devices, other than the first one of the electrical devices, to a secondary control unit of one of the electrical devices in a second series of electrical devices. As embodied in FIG. 4, series II of electrical devices includes electrical devices $EDII_1$ (which is also $EDI_3$), $EDII_2$ and $EDII_3$. The connecting means includes cable $28I_1$ connected to the output pin connector (not shown) of the main control unit of $EDII_1$ and to the input pin connector (not shown) of the secondary control unit of $EDII_2$.

Also in accordance with the invention, means are provided for connecting the secondary units of each remaining electrical device in the second series of electrical devices such that an operational state of each electrical device in the second series of electrical devices is controlled by the predetermined one of the electrical devices in the first series of electrical devices. As embodied herein, this means includes cable $28II_2$ connected to the output and input pin connectors (not shown) of the secondary control units of $EDII_2$ and $EDII_3$, respectively.

Thus, in accordance with the invention, the same electrical device ($EDI_3/EDII_1$) may be configured as both a secondary electrical device in a first series of electrical devices and as a main electrical device in a second series of electrical devices. This configuration can be repeated to create a plurality of series of electrical devices having branches of series of electrical devices.

Preferably, in a series of electrical devices, a main electrical device controls up to ten secondary electrical devices; however this number may be changed depending on the conditions and limitations of the circuitry.

It will be apparent to those skilled in the art that various modifications and variations can be made to the present invention as embodied herein, without departing from the spirit or scope of the present invention. For example, in FIG. 3, transistor $Q_m$ is shown as a phototransistor responsive to LED 34. This is an optical isolation configuration to provide ground circuit isolation in a preferred embodiment. However, any form of switching configuration can be used to provide the functionality of a main control unit as described herein. Thus, it is intended that the present invention cover various modifications and variations of the embodiments disclosed herein, that the scope of the invention not be limited by the disclosure, and that the full scope of the invention be defined by the appended claims and their equivalents.

What is claimed is:

1. An apparatus for controlling a plurality of electrical devices, each of said plurality of electrical devices including switching circuitry for switching each of said plurality of electrical devices to a standby mode or an operational mode, comprising:

a main control unit provided in each of said plurality of electrical devices;

a secondary control unit provided in each of said plurality of electrical devices;

first connecting means for connecting a main control unit of a first one of said plurality of electrical devices to a secondary control unit of a second one of said plurality of electrical devices; and said secondary control unit includes first control means, responsive to said connecting means, for transferring control of an operational stage of said second one of said plurality of electrical devices to said main control unit of said first one of said plurality of electrical devices from said secondary control unit of said second one of said plurality of electrical devices when said first connecting means connects said main control unit of said first one of said plurality of electrical devices to said secondary control unit of said second one of said plurality of electrical devices.

2. An apparatus according to claim 1, wherein said first control means of said secondary control unit of said second one of said plurality of electrical devices controls the operational state of said second one of said plurality of electrical devices when said first connecting means is disconnected from either of said first and second ones of said plurality of electrical devices.

3. An apparatus according to claim 1, wherein said main control unit of each of said plurality of electrical devices comprises a first switch, said first control means comprises a second switch and a sensing circuit, said sensing circuit having at least one input connected to an output of said second switch and having an output connected to said switching circuitry, and said input of said sensing circuit of said secondary control unit of said second one of said plurality of electrical devices is connected by said first connecting means to said first switch in said main control unit of said first one of said plurality of electrical devices such that said sensing circuit senses said first switch when said first connecting means is connected to both said first and second ones of said plurality of electrical devices, and said sensing circuit senses said second switch when said first connecting means is disconnected from either of said first and second ones of said plurality of electrical devices.

4. An apparatus according to claim 3, wherein, said main control unit of each of said plurality of electrical devices further comprises an output pin connector, said secondary control unit of each of said plurality of electrical devices further comprises an input pin connector and an output pin connector, and said first connecting means comprises a cable having pin connectors at each end.

5. An apparatus according to claim 4, wherein, said output pin connector of said main control unit has a plurality of pins, said first switch of each main control unit of said plurality of electrical devices comprises a transistor having a base responsive to the operation of a power switch, an emitter connected to a first predetermined pin of said output pin connector and a collector connected to a second predetermined pin of said output pin connector.

6. An apparatus according to claim 5, wherein said transistor comprises a phototransistor and said base of said transistor is optically connected to said power switch.

7. An apparatus according to claim 5, wherein said first predetermined pin of said output pin connector is shorted to a third predetermined pin of said output pin connector.

8. An apparatus according to claim 3, wherein, said secondary control unit of each of said plurality of electrical devices further comprises an input pin connector having a plurality of pins, said sensing circuit of each secondary control unit of each of said plurality of electrical devices comprises a differential amplifier having first and second inputs, and said second switch of each secondary control unit of said plurality of electrical devices comprises a transistor having an emitter connected to said first input of said differential amplifier and to a first predetermined pin of said input pin connector, a collector connected to said second input of said differential amplifier and a second predetermined pin of said input pin connector, and a base connected to a third predetermined pin of said input pin connector.

9. An apparatus according to claim 8, wherein said secondary control unit of each of said plurality of electrical devices further comprises an output pin connector having a said emitter of said transistor is connected to a first predetermined pin of said output pin connector, said collector of said transistor is connected to a second predetermined pin of said output pin connector, and said base of said transistor is connected to a third predetermined pin of said output pin connector.

10. An apparatus according to claim 9, wherein said first and second predetermined pins of said output pin connector of each main control unit of each of said plurality of electrical devices and said input and output pin connectors of each secondary unit of each of said plurality of electrical devices is longer than the remaining pins thereof.

11. An apparatus according to claim 5, wherein said main control unit further comprises a light emitting diode connected to said power switch for emitting light to turn ON said phototransistor when said power switch is turned ON.

12. An apparatus for controlling a plurality of electrical devices, each of said plurality of electrical devices including switching circuitry for switching each of said plurality of electrical devices to a standby mode or an operational mode, comprising:

a main control unit provided in each of said plurality of electrical devices;

a secondary control unit provided in each of said plurality of electrical devices;

first connecting means for connecting a main control unit of a first one of said plurality of electrical devices to a secondary control unit of a second one of said plurality of electrical devices;

said secondary control unit of said second one of said plurality of electrical devices including control means, responsive to said first connecting means, for transferring control of an operational state of said second one of said plurality of electrical devices to said main control unit of said first one of said plurality of electrical devices when said first connecting means connects said main control unit of said first one of said plurality of electrical devices to said secondary control unit of said second one of said plurality of electrical devices;

second connecting means for connecting said secondary control unit of said second one of said plurality of electrical devices to a secondary control unit of a third one of said plurality of electrical devices; and said secondary control unit of said third one of said plurality of electrical devices including control means, responsive to said second connecting means, for transferring control of an operational state of said third one of said plurality of electrical devices to said main control unit of said first one of said plurality of electrical devices when said second connecting means connects said secondary control unit of said second one of said plurality of electrical devices to said secondary control unit of said third one of said plurality of electrical devices.

13. An apparatus according to claim 12, wherein said control means of said secondary control unit of said second one of said plurality of electrical devices controls the operational state of said second one of said plurality of electrical devices when said first connecting means is disconnected from either of said first and second ones of said plurality of electrical devices.

14. An apparatus according to claim 12, wherein said main control unit of each of said plurality of electrical devices comprises a first switch, said control means comprises a second switch and a sensing circuit, said sensing circuit comprises a differential amplifier having first and second inputs and having at least one input connected to an output of said second switch and having an output connected to said switching circuitry, said secondary control unit of each of said plurality of electrical devices includes an input pin connector having a plurality of pins, and said second switch of said control means comprises as transistor having an emitter connected to said first input of said differential amplifier and to a first predetermined pin of said input pin connector, a collector connected to said second input of said differential amplifier and a second predetermined pin of said input pin connector, and a base connected to a third predetermined pin of said input pin connector.

15. An apparatus according to claim 14, wherein said secondary control unit of each of said plurality of electrical devices further comprises an output pin connector having a plurality of pins, and said emitter of said transistor is connected to a first predetermined pin of said output pin connector, said collector of said transistor is connected to a second predetermined pin of said output pin connector, and said base of said transistor is connected to a third predetermined pin of said output pin connector.

16. An apparatus according to claim 15, wherein said main control unit of each of said plurality of electrical devices comprises an output pin connector having a plurality of pins, said first switch of each main control unit of said plurality of electrical devices comprises a transistor having a base connected to a power switch, an emitter connected to a first predetermined pin of said output pin connector and a collector connected to a second predetermined pin of said output pin connector, at least said first and second predetermined pins of each of said output pin connector of said main control unit and said input and output pin connector of said secondary control unit of each of said plurality of electrical devices being longer than the remaining pins thereof.

17. An apparatus according to claim 14, wherein said transistor comprises a phototransistor and said base of said phototransistor is optically connected to said power switch.

18. An apparatus according to claim 17, wherein said main control unit of each of said plurality of electrical devices further comprises a light emitting diode connected to said power switch for emitting light to turn ON said phototransistor when said power switch is turned ON.

19. An apparatus according to claim 18, wherein said first predetermined pin of said output pin connector is shorted to a third predetermined pin of said output pin connector.

20. An apparatus according to claim 12, wherein said main control unit of each of said plurality of electrical devices further comprises a first switch and an output pin connector having a plurality of pins, and said first switch of each main control unit of said plurality of electrical devices comprises a transistor having a base connected to a power switch, an emitter connected to a first predetermined pin of said output pin connector and a collector connected to a second predetermined pin of said output pin connector.

21. An apparatus according to claim 12, wherein said main control unit of each of said plurality of electrical devices includes an output pin connector, said secondary control unit of each of said plurality of electrical devices includes an input pin connector and an output pin connector, and said first and second connecting means comprise cables having pin connectors at each end.

22. An apparatus for controlling first and second series of electrical devices, each of said electrical devices including switching circuitry for switching each of said electrical devices to a standby mode or an operational mode, comprising:

a main control unit provided in each of said electrical devices;

a secondary control unit provided in each of said electrical devices;

means for connecting a main control unit of a first one of said electrical devices in said first series of electrical devices to a secondary control unit of a second one of said electrical devices in said first series of electrical devices;

means for connecting the secondary control units of each remaining electrical device in said first series of electrical devices to each other;

means, responsive to said means for connecting the secondary control units of each remaining electrical device in said first series, for transferring control of an operational state of each electrical device in said first series to said main control unit of said first one of said electrical devices in said first series of electrical devices when said secondary control units of each remaining electrical device in said first series are connected;

means for connecting the main control unit of a predetermined one of said electrical devices other than said first one of said electrical devices in said first series of electrical devices to a secondary control unit of one of said electrical devices in said second series of electrical devices;

means for connecting the secondary control units of each remaining electrical device in said second series of electrical devices to each other; and means, responsive to said means for connecting the secondary control units of each remaining electrical device in said second series, for transferring control of an operational state of each electrical device in said second series of electrical devices to said predetermined one of said electrical devices in said first series of electrical devices when said secondary control units of each remaining electrical device in said second series are connected.

* * * * *